Sept. 19, 1961   M. BERLIN ET AL   3,000,251
DIE AND METHOD OF MAKING SAME
Filed April 8, 1957

INVENTORS.
MILTON BERLIN.
LAWRENCE M. RHEINGOLD.
BY Percy Freeman
ATTORNEY.

United States Patent Office 3,000,251
Patented Sept. 19, 1961

3,000,251
DIE AND METHOD OF MAKING SAME
Milton Berlin, Forest Hills, and Lawrence M. Rheingold, Baldwin, N.Y., assignors to Templet Industries, Incorporated, Brooklyn, N.Y., a corporation of New York
Filed Apr. 8, 1957, Ser. No. 651,252
3 Claims. (Cl. 83—690)

This invention relates to rule die sets and, more particularly, to rule die sets that contain no more than the minimum of essential striking structure necessary to perform the shearing and punching of metals, and to a method for constructing such rule die sets with this purpose in mind.

Rule die sets have recently become popular for effecting the economical shearing and punching of metals. However, certain dimensions of various parts of the die sets become critical as these efficiencies are carried out and become dependent upon the type of material being worked. As the male die member is usually in the form of a rigid punch or shear plate, it is only necessary that this plate be of sufficient thickness, while the female die member is constructed of a number of parts that must bear a certain relationship with each other. Accordingly, it is an object of the present invention to provide a rule die set that is extremely simple in construction, requires a minimum number of parts, and which is extremely accurate for the purposes desired.

Another object of the present invention is to provide a rule die member that includes a pair of elastically compressible die blocks, between which the die rule is supported in predetermined relationship thereto, as to size and shape, so that the required amount of blanking strength may be had with a minimum amount of material for striking metal stock of various types.

Another object of the present invention is to provide a method for fabricating rule die assemblies to provide the required blanking forces with a minimum amount of material and parts.

A still further object of the present invention is to provide a die rule assembly and method of constructing such assembly wherein the size and relationship of the various elements are coordinated so as to enable the production of a die having a minimum amount of material and parts for the specific function to be performed.

Still another object of the present invention is to provide a die rule member and method of construction in which the size and relationship of the blanking elements are related to the thickness and hardness of the stock material to be struck so that a systematic method may be adhered to for the efficient and economical construction of the die sets, whereby trial and error steps are eliminated.

All of the foregoing and still further objects and advantages of this invention will become apparent from a study of the following specification, taken in connection with the accompanying drawing, wherein.

Figure 2:
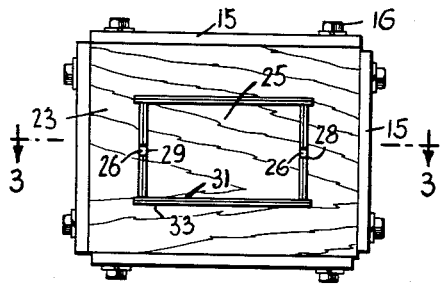
FIGURE 2 is a bottom plan view of the female die member.
Figure 3:
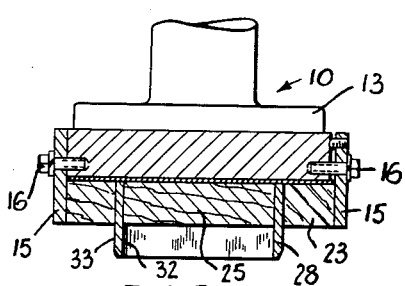
FIGURE 3 is a longitudinal cross sectional view taken along line 3—3 of FIGURE 2.
Figure 4:
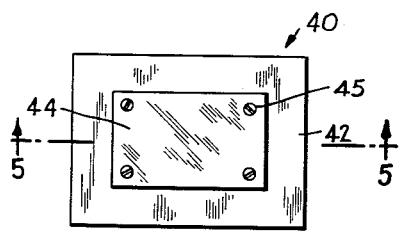
FIGURE 4 is a top plan view of the male die member.
Figure 5:
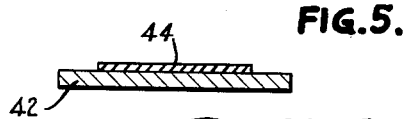
FIGURE 5 is a longitudinal cross sectional view taken along line 5—5 of FIGURE 4.

Referring now to the drawing, and more particularly to FIGURES 1 to 5 thereof, a rule die set made in accordance with the present invention is shown to include a female die assembly 10 that is supported beneath an upper bolster that is arranged for reciprocating vertical movement by a press ram 13. This assembly includes lock up bank plates 15 that are actuated by lock up screws 16 for securing the female die member 20 in an assembled relationship therewith. The lock up screws 16 and bank plates 15 are used to densify the die stock material in the manner disclosed in my co-pending application, Serial Number 590,487, filed June 11, 1956, for Method and Means for Lockingly Securing Rule Dies in Die Blocks (now abandoned) and the continuation-in-part thereof, Serial No. 643,595, filed March 4, 1957, for Rule Die Set and Method of Making Same (now United States Letters Patent No. 2,850,096 issued September 2, 1958). Thus, the die member 20 is shown to include an outer compression block 23 and a mating inner compression block 25 that define a space 26 therebetween. This space is slightly narrower than the thickness of the die rule 28 that is inserted therebetween to complete the die member. The die rule 28 is formed from a strip of metal and sufficient space 29 is provided between the adjacent free ends thereof to accommodate a limited amount of compression during the locking up of the female die member. One edge of the die rule 28 extends outwardly beyond the surface of the compression blocks and is provided with a perpendicularly related surface or land 32 immediately adjacent to the inner side 31 of the formed rule. A re-entrant inclined surface 34 extends between the land 32 and the opposite outer side 33 of the die rule, the inclined surface and the land defining an included angle of approximately 45°. The opposite edge 36 of the rule lies in a plane common to the outer sides of the compression blocks so as to form a smooth continuous surface therewith, that is places into bearing relationship with a rigid die backing plate 21. The female die member 20 is inserted as a unit into the bank plates 15 of the upper bolster 12, whereupon the bank plates may be used to compress the die member so as to densify the compressible die blocks to properly shape the rule die and secure it in place between the inner and outer compression blocks.

Figure 1:
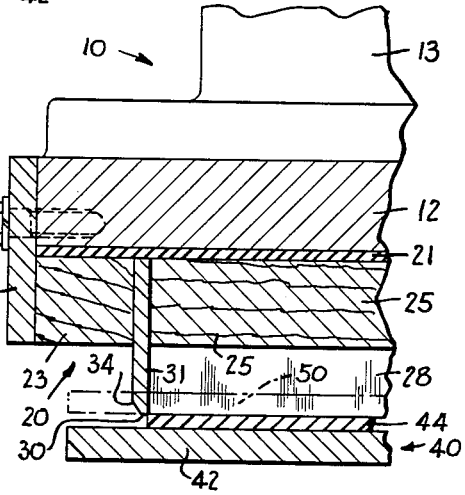
FIGURE 1 is a fragmentary side elevational view, partly in section, of a rule die set made in accordance with the present invention.

The male die assembly 40 includes the press bed bolster 42 and the shear plate or male die member 44 that is secured to the upper surface thereof, such as by bolts 45. The outline of the male die member 44 conforms to the shape of the object to be struck by the die set and thus, corresponds to the outline defined by the inner side 31 of the die rule 28. As is shown in FIGURE 1, the metal stock 50 is adapted to be supported upon the male die member 44 so that the female die member 20 may be brought into shearing and punching relationship therewith to form the desired product.

It has been found that only a very small proportion of any die performs the actual shearing and punching of the metal sheet. All other material and land areas function merely as a retaining wall for the small section of material that does the actual work. Accordingly, by eliminating most of such excess material, a die can be constructed that has a minimum amount of material, whereby the forming of the parts can be simplified and the cost of the die reduced. These efficiencies are further amplified by maintaining a predetermined relationship between the parts, whereby certain elements thereof may be changed according to the type and size of the material to be struck, thereby facilitating the production of dies for various jobs.

Figure 6:
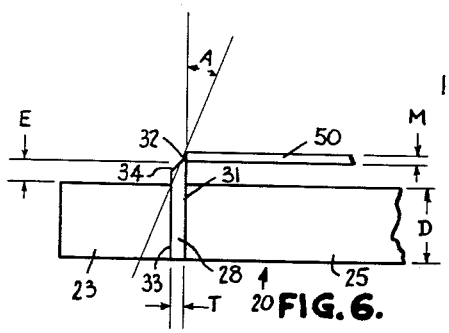
FIGURE 6 is a schematic diagram of certain of the elements of the female die member, illustrating certain relationships as to size and location.

Referring now to FIGURE 6 of the drawing, a schematic diagram of the relationship of the parts of the female die member 20 to the sheet metal stock 50 is shown for accomplishing substantially any type of metal forming operation. The outer and inner compression blocks 23, 25 are preferably constructed from a compressible material, such as plywood, having a thickness D of approximately three-quarters of an inch. The die rule 28 has a thickness T at least equal to the thickness M of the metal sheet 50 to be struck. The working edge of the die rule 28 extends outwardly beyond the adjacent side of the compressible die blocks a distance E that is at least twice the thickness of the metal sheet 50. If desired, this space may be used to accommodate a suitable stripper plate for effecting the removal of the stamping from the female die during the operaion of the press. It will be noted that an angle A is formed between a line extending from the point of contact of the outer side 33 with the adjacent side of the compression block 23 and the remote edge of the metal stock to be stamped, and a line forming an extension of the inner side 31 of the rule die. These lines preferably define a minimum angle of ten degrees in which the tangent thereof is equal to the thickness of the die rule divided by the sum of the thicknesses of the sheet material to be struck plus the distance which the rule die extends beyond the adjacent side of the compression block.

It will be recognized by those skilled in the art that a stamping produced by any standard punch and die presents a bright pressure line around the periphery of the stamping and the working edge of the die steel. Notwithstanding the fact that the metal being punched or sheared is resting upon a perfectly flat surface, a phenomenon is observed in which this pressure line is substantially equal to the breakthrough of the material being stamped. The energy required to shear the given piece of metal while applied in a vertical line at the point or edge of shear does have a vector force resulting up to an angle of forty-five degrees from the critical or yield point of shear. This produces the observed pressure or stress line 55 and is directly proportional to the thickness and hardness characteristics of the metal that is blanked and the corresponding breakthrough section. The use of the present method in the manufacture of the female die member obviates the necessity for using die steel in sections that is normally required to provide the required strength. The die rule replaces the pressure line that is usually formed at the edge of the conventional dies and is provided with a flat land 32 having a width approximately equal to the bright pressure line caused by the vector force of shear stress. The practical minimum dimensions may be specified in the relationship $$\tan A = \frac{T}{E+M}$$

where A is the included angle whose opposite side is the thickness of the steel rule T, and the adjacent side is equal to the sum of the sheet metal stock thickness M plus E, the distance the die rule extends outwardly beyond the compression blocks. While it has been empirically established, using present standards available, that eleven degrees would constitute a minimum included angle when stamping cold rolled or S.A.E. 1010 steels, a smaller angle of 7½° may be used in striking porous materials, such as plastics, fibres, etc., considering that these minimum angles are critical and the bending moment of the rule section increases as the angle decreases. While it has not been considered practical to use an included angle of less than 7½°, any larger angle may be used as may be defined by the aforementioned relationship.

Figure 7:
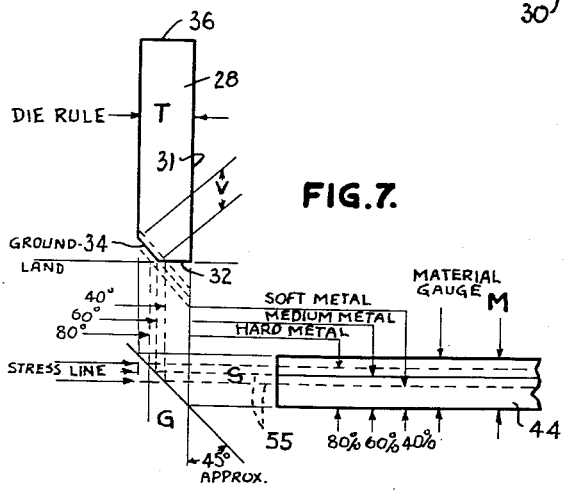
FIGURE 7 is a schematic diagram of the female die rule and the stock material to be struck, illustrating the relationships of certain of the parts of the rule with the characteristics of the metal to be struck.

With reference to FIGURE 7 of the drawing, it will be noted that the width of the land 32 necessarily increases with the hardness and thickness of the blanking material, as is determined by the breakthrough below the stress line of the particular material, hereinafter called the "fracture distance." Thus as the metal becomes softer, the breakthrough decreases, thereby permitting a narrower land 32. Since the breakthrough is that portion of the metal thickness that lies below the stress line, the thickness of the material also materially affects the size of the land 32. From the foregoing it will be clear that the width of the land is proportional to the fracture distance.

By following the aforementioned procedure, the proper minimum dimensions for each of the critical parts may readily be determined for the particular type and thickness of metal to be struck. Since these dimensions approach the minimum required dimensions, there is substantially no waste of material so that the manufacture of the die may be effected efficiently and economically. While the dimensions may be increased, as may be desired, this method provides the minimum dimensions required for satisfactory operation so that a die rule set of efficient and economical construction can be provided.

While this invention has been described with particular reference to the construction shown in the drawing, it is to be understood that such is not to be construed as imparting limitations upon the invention, which is best defined by the claims appended hereto.

We claim:

1. In a die set for blanking out a shape from metal:
   a pair of cooperating die members arranged in mutual alignment and for relative reciprocatable translatory movement towards and away from one another from spaced into operative engagement,
   one of said members constituting at least two compressible die blocks having complemental edge surfaces,
   a die rule defining a closed shape located and held between said complemental surfaces and having a longitudinal edge portion protruding beyond said die blocks towards the other member,
   and a rigid backing plate against which said die blocks and die rule are abutted,
   said die rule having an inner surface which is parallel to the direction of movement of said members and which extends all the way to the free edge of the die rule,
   said free edge of the die rule including a plane portion which meets the inner surface of the die rule at an angle of 90°,
   the outer surface of said die rule adjacent the free edge of said die rule constituting an inclined bevel which meets the plane portion of said free edge of the die rule at an angle,
   said plane portion having a width which is proportional to the fracture distance of the metal to be blanked,
   the thickness of the die rule being at least substantially equal to the thickness of the metal being blanked,
   the thickness M of the metal to be blanked, the distance E the free edge is located beyond said die blocks and the thickness T of the die dule being so interrelated that the angle A formed by said thicknesses and distance is at least 10° where $$\tan A = \frac{T}{E+M}$$

2. A die set as set forth in claim 1 wherein the angle of the bevel is approximately 45°.

3. In a die set for blanking out a shape from metal:
   a male die member,
   a female die member dimensioned to cooperate with the male die member for blanking out a shape from metal,
   means mounting said male and female die members in mutual alignment and for relative reciprocatable translatory movement towards and away from one another from spaced into operative engagement,
   said female die member including at least two compressible die blocks having complemental edge surfaces, a die rule defining a closed shape located and held between said complemental surfaces and having a longitudinal edge portion protruding beyond said die blocks toward the male die member, a rigid backing plate against which said die blocks and rule die are abutted, and peripheral compression means carried by said rigid plate for compressing said die blocks against said die rule, said die rule having an inner surface which is parallel to the direction of movement of said male and female die members towards and away from one another and which extends all the way to the free edge of the die rule, said free edge of the die rule including a plane land which meets the inner surface of the die rule at an angle of 90°, said land having a width which is proportional to the fracture distance of the metal to be blanked, the outer surface of said die rule adjacent the free edge of said die rule constituting an inclined bevel which meets the land at an angle, the thickness M of the metal to be blanked, the distance E the free edge is located beyond said die blocks and the thickness T of the die rule being so interrelated that the angle A formed by said thicknesses and distance is at least 10° where $$\tan A = \frac{T}{E+M}$$

References Cited in the file of this patent

UNITED STATES PATENTS

| | | |
|---|---|---|
| 163,674 | McKenzie | May 25, 1875 |
| 487,984 | Shields | Dec. 13, 1892 |
| 1,082,986 | Wilder | Dec. 30, 1913 |
| 2,563,741 | Patton | Aug. 7, 1951 |
| 2,821,871 | Sarno | Feb. 4, 1958 |
| 2,850,096 | Berlin | Sept. 2, 1958 |

OTHER REFERENCES

American Machinist, vol. 94, Issue No. 22, pp. 85–88, published Oct. 30, 1950.